United States Patent [19]

Guglielmi et al.

[11] 4,363,728

[45] Dec. 14, 1982

[54] AUTOMATIC CHLORINATOR FOR SWIMMING POOLS

[76] Inventors: William P. Guglielmi, 66 Indian Trail, Vernon, Conn. 06066; Richard E. Caserta, 95 N. Mountain Rd., Canton, Conn. 06019

[21] Appl. No.: 257,644

[22] Filed: Apr. 27, 1981

[51] Int. Cl.³ .............................................. C02B 3/06
[52] U.S. Cl. .................................. 210/205; 210/169; 210/206
[58] Field of Search ............... 210/169, 205, 206, 101, 210/753–756

[56] References Cited

U.S. PATENT DOCUMENTS

| | | | |
|---|---|---|---|
| 1,800,378 | 4/1931 | Everson | 210/169 X |
| 2,472,309 | 6/1949 | Opsahl | 210/169 |
| 3,912,627 | 10/1975 | Tepas, Jr. | 210/756 |
| 4,208,376 | 6/1980 | Sangster et al. | 210/169 X |

*Primary Examiner*—John Adee
*Attorney, Agent, or Firm*—Prutzman, Kalb, Chilton & Alix

[57] ABSTRACT

A chlorinator is provided for connection upstream of a pump in a swimming pool water recirculating system which includes a container for holding a supply of chlorinating liquid, a plurality of metering tubes having differing resistances to liquid flow extending into the container with their inlets immersed in the chlorinating liquid, and means for selectively connecting a selected one of the metering tubes to an outlet adapted to be connected to a swimming pool water circulating system. A pressure control valve may be provided between the metering tubes and the outlet and filler means may be provided at the metering tube inlets.

18 Claims, 8 Drawing Figures

U.S. Patent  Dec. 14, 1982  Sheet 1 of 2  4,363,728
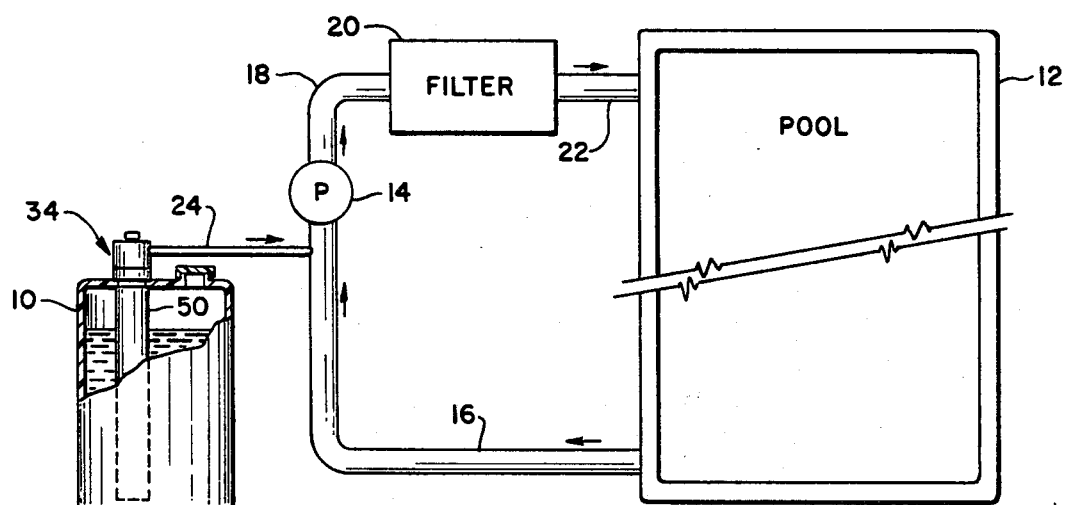
FIG. 1
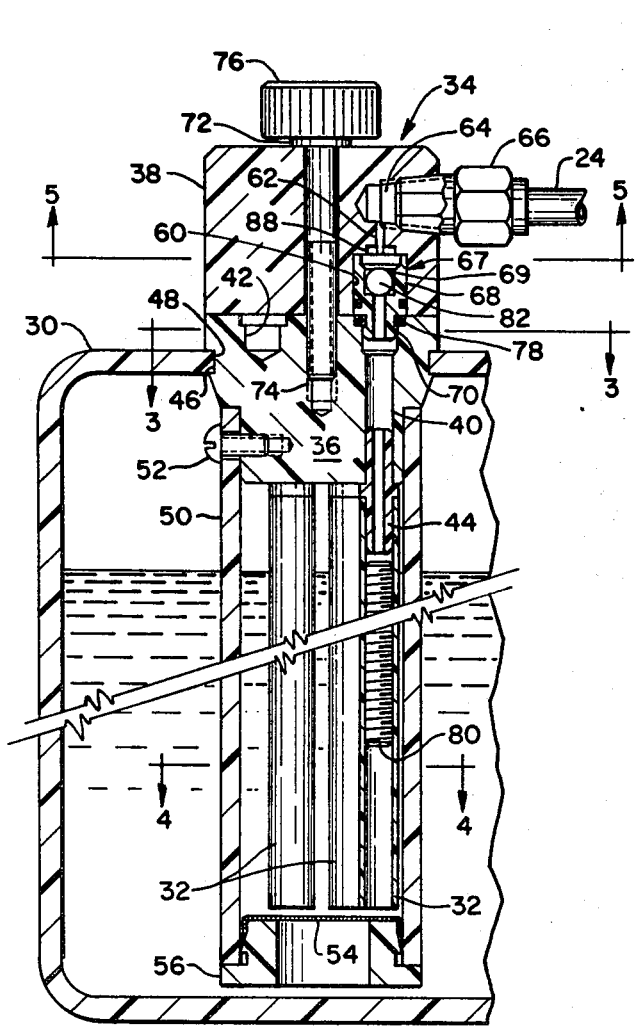
FIG. 2
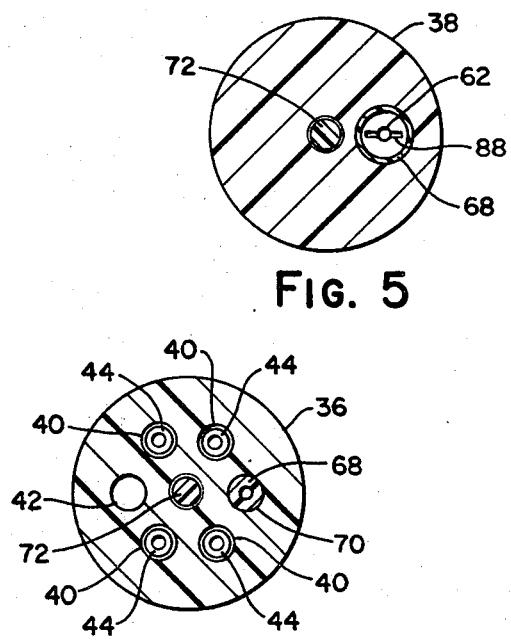
FIG. 5
FIG. 3
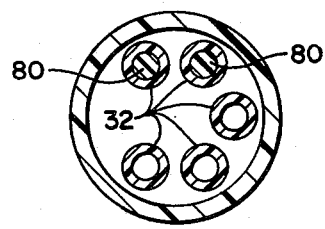
FIG. 4

AUTOMATIC CHLORINATOR FOR SWIMMING POOLS

The present invention relates to swimming pools and is concerned, more particularly, with new and improved apparatus for automatically introducing a liquid chlorinating agent in controlled amount into the pool water.

As is well known, proper sanitary maintenance of a swimming pool requires keeping the water chlorinated to eliminate bacteria and algae that endanger the swimmer's health or make swimming unpleasant. As the chlorine is used up in the process of eliminating the bacteria and algae, chlorine must be constantly added when the pool is in use. The chlorinating agent almost universally used by pool owners is calcium hypochlorite in granular or tablet form which periodically is manually thrown into the pool or sometimes put in baskets or porous bags which are lowered into the pool. The usual practice is to test the water from time to time to insure that there is always some residual chlorine present in the pool water but not an excess which would be wasteful and also unpleasant or uncomfortable for the swimmer.

The need for such continuous maintenance is a nuisance which greatly detracts from the enjoyment of the pool and because the addition of the hypochlorite is not automatic, there is always the danger that the pool attendant will forget or otherwise inadvertently fail to make the necessary periodic additions with resulting undesirable effect upon the sanity condition of the pool. It has been proposed heretofore to provide automatic chlorinators for connection to the pool recirculating system which will continuously or periodically feed a liquid chlorinating agent to the pool water, but usually such apparatuses have not operated satisfactorily and have not met with commercial success. A principal drawback of such prior apparatuses has been the inability to provide for accurate and adjustable metering which will provide a flow of the right amount of chlorinating liquid in order to maintain the desired residual of chlorine but not an undesirable excess thereof in the pool water under widely varying conditions of pool operation and use. Another disadvantage of such apparatuses has been the high cost and complicated design and operation rendering the apparatus difficult to use and unreliable and undependable under normal operating conditions.

Accordingly, it is a principal aim of the present invention to provide an automatic chlorinator for connection to the recirculating system of swimming pools which will accurately meter the amount of chlorinating liquid introduced into the pool water so as to provide the correct amount for maintaining the desired residual of chlorine without excess. Included in this aim is the provision of such apparatus which is easily adjustable to provide different metering rates but without loss of metering accuracy whereby the chlorinater is suitable for use with pools of varying size and location and, more importantly, so that the metering rate can be varied as needed to accommodate varying conditions of operation such as with respect to the number of bathers and frequency of use of the pool.

A further object of the invention is to provide a chlorinator of the type referred to which is of simple design and relatively inexpensive to fabricate and assemble and easy to install and maintain requiring a minimum of instruction and skill and yet which is strongly built and safe in operation and has a long operating life providing dependable and reliable service over long periods of time without requiring repair or replacement.

Another object of the invention is to provide a chlorinator of the type referred to which is simple and relatively inexpensive to fill with a supply of liquid chlorinating agent and more specifically, one which can utilize the readily available and relatively inexpensive chlorinating liquids such as sodium hypochlorite solutions which are commonly sold in stores and supermarkets as household bleach.

Other objectives will in part be obvious and in part pointed out in more detail hereinafter.

A better understanding of the invention will be obtained from the following description and the accompanying drawings of specific illustrative embodiments of the invention.

BRIEF DESCRIPTION OF THE DRAWINGS

In the drawings:

FIG. 1 is a diagrammatic view of a conventional swimming pool and its water recirculation system in combination with a chlorinator of this invention, the latter being partially cut away to show the interior thereof;

FIG. 2 is a fragmentary enlarged vertical sectional view of the chlorinator shown in FIG. 1;

FIG. 3 is a cross-sectional view taken along the line 3—3 of FIG. 2;

FIG. 4 is a cross-sectional view taken along the line 4—4 of FIG. 2;

FIG. 5 is a cross-sectional view taken along the line 5—5 of FIG. 2;

DESCRIPTION OF THE PREFERRED EMBODIMENTS

Figure 7:
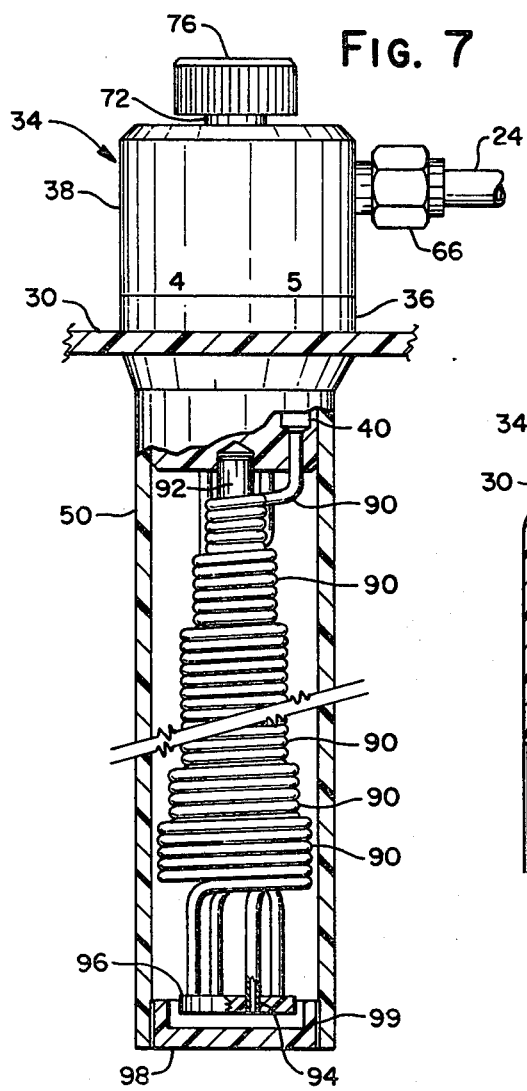
FIG. 7 is a fragmentary side view partially in cross-section of a modified embodiment of the chlorinator shown in FIG. 1.

Referring to the drawings in detail, and particularly to FIG. 1, the chlorinator 10 of the present invention is shown connected to the recirculating system for a swimming pool 12 of the type commonly built for private residential use. The recirculating system comprises a pump 14 having its inlet side connected to a pipe 16 which in turn is connected for withdrawing water from the pool 12, and having its outlet side connected by pipe 18 to filter 20 which in turn is connected to pipe 22 for returning the water to the pool 12. A tube 24 connects the chlorinator 10 to the recirculating system upstream of the pump 14. The tube 24 may be connected to the water withdrawal pipe 16, at the selected location, in any convenient manner as, for example, by means of a conventional saddle clamp fitting (not shown) or, if desired, connection may be made to the usual pool intake housing drain plug (not shown). The chlorinator 10 may be located at any convenient place adjacent to the pool and/or the pool recirculating system where it is accessible for loading and adjustment, and preferably it is mounted with its bottom at an elevation at least as high as the pool water level.

Referring to the preferred embodiment of the chlorinator 10 shown in FIGS. 2-6 of the drawings, it will be seen that it comprises a generally cylindrical container 30 which preferably is of one-piece plastic construction and which holds the liquid chlorinating agent which is to be fed to the pool recirculating system. The user may make up his own chlorinating liquid if desired but it is an advantage of the chlorinator of the invention that it may be operated satisfactorily using liquid bleach of the type readily available in stores and supermarkets. Such liquid bleaches usually comprise a 5.25% aqueous solution of sodium hypochlorite. The capacity of the container 30 is preferably large enough so that it does not need to be filled frequently. As a specific example, a fifteen gallon container will be ample to treat a conventional 16'×32' pool, which usually requires about one quart of liquid bleach a day for proper maintenance, for approximately 8 to 10 weeks without refilling.

Disposed in the container 30 is a cluster of elongated metering tubes 32 which are supported at their upper ends by a supporting head 34 and depend downwardly therefrom with their lower ends adjacent the bottom of the container 30. The supporting head 34 comprises a lower section 36 and an upper rotatably adjustable cap section 38. The lower section 36 has five through bores 40 and a closed end bore 42 arranged in a circle about the central axis of the supporting head 34. The upper ends of the metering tubes are connected to the through bores 40 by nipples 44 (only one shown). The lower section 36 of the supporting head 34 has a generally truncated conical shape and an annular groove 46 and is dimensioned to be engaged in the opening 48 by being pressed inwardly until the edge or rim of the opening 48 snaps into the groove 46. Once in place, the supporting head 34 can be swivelled about its center axis. A tubular housing 50 surrounds the metering tubes 32 and is secured at its upper end to the lower section 36 of the supporting head 34 by suitable fastening means such as the screw 52. The bottom end of the housing 50 is provided with a filter comprising a fine mesh plastic screening material 54 held in place by a plug 56 which is press fit into the lower opening of the housing 50.

The cap section 38 of the supporting head 34 has a vertical bore 60 communicating via an orifice 62 with a transverse bore 64 having a fitting 66 at its outer end for connection with the tube 24, which delivers the chlorinating liquid to the pool water recirculating system as previously described. Disposed in the vertical bore 60 is a valve 67 having a housing 68 formed with a depending ferrule 70 which is adopted to be inserted into one of the bores 40 or the bore 42 in the lower section 36 of head 34 when the upper cap section 38 is in place on the lower section 36. The upper cap section 38 is secured to the lower section 36 by an elongated screw 72 extending through the center of cap section 38 into threaded engagement with the tapped hole 74 in lower section 36. The upper end of screw has a knob 76 which can be rotated in one direction by the user to release the cap section 38 sufficiently to permit the ferrule 70 to be lifted out of the bores 40,42 permitting the cap section 38 to be rotated to align the ferrule 70 with the desired bore 40,42 and can be rotated in a reverse direction to clamp the cap section 38 in selected rotated position on the lower head section 36. An O-ring 78 on the ferrule 70 assures a liquid tight connection between ferrule 70 and the selected bore 40, 42 when the cap section 38 is tightened against the top of the lower section 36 by the screw 72.

Figure 6:
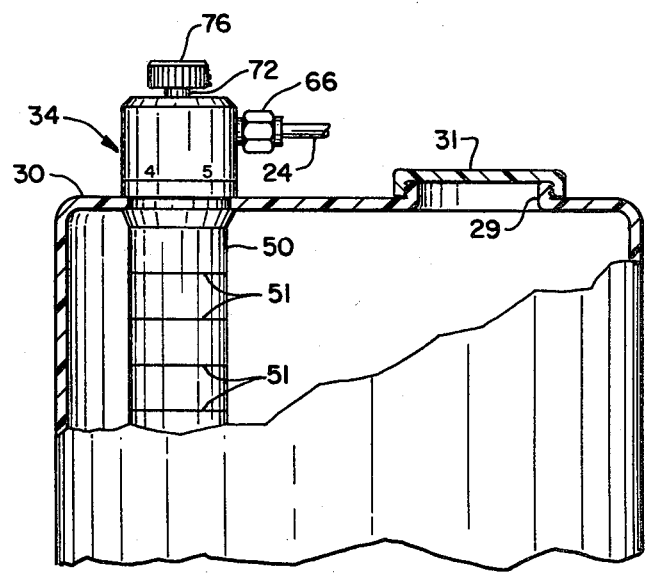
FIG. 6 is fragmentary enlarged side view of the chlorinator, partially in cross-section.

In the specific embodiment shown in FIGS. 2-6, the tubes 32 are all of equal length but are provided with threaded rod inserts 80 of varying length whereby the tubes 32 have varying resistances to liquid flow. The object is to provide a choice of restricted passageways for selective use in metering the chlorinating liquid to the water recirculating system of the swimming pool and which provide a range of metering rates normally suitable for most pools. If the initial setting provides too fast a metering rate so that the pool receives an excess of chlorine, the operator merely resets the cap section 38 of the head 34 to a different rotated position relative to the lower section 36 to connect to a tube having a higher resistance to liquid flow. Conversely, if the flow of chlorinating liquid is too slow, the cap section 38 is reset to connect to a tube having a lower resistance to flow. As shown in FIG. 6, the supporting head 34 may be provided with indicia to indicate which of the tubes 32 is connected in the selected position of the cap section 38. If it is desired to shut off the chlorinator so that no chlorinating liquid is delivered to the poor recirculating system, the cap section 38 is rotated to the position where the ferrule 70 is seated in the closed end bore 42.

The valve housing 68 contains a ball 82 which, because of gravity, normally seats on the inlet orifice 84 and when it closes the orifice 84, it functions as a one way valve preventing reverse flow of liquid through the valve housing 68. However, when the pump 14 of the water recirculating system is operating, there is a pressure drop in the discharge tube 24 applying sufficient suction to withdraw chlorinating liquid from the container 30 through the selected metering tube 32 and causing ball 82 to rise within the interior chamber 69 of the valve housing 68 and move toward the outlet orifice 62. As will be apparent, the pressure drop caused by the operation of the pump 14 may not always be constant as a result of varying operating conditions, and it is an advantage of the invention that the interior chamber 69 of the valve is contoured so that as the velocity of flow of liquid through the valve increases and the ball 82 rises in response thereto, the ball 82 will restrict the flow to the outlet orifice 62, thus maintaining a substantially constant rate of flow of chlorinating liquid despite variations in pressure. A slot 88 across the outlet orifice 62 prevents the ball 82 from completely shutting off the flow through orifice 62.

As best shown in FIG. 6 of the drawings, the container 30 has a top filler opening 29 fitted with a threaded closure cap 31 which may be removed when more chlorinating liquid is to be added. Also as shown in FIG. 6, the tubular housing 50 is provided with indicia in the form of lines 51 spaced at vertical intervals for indicating the height and hence the volume of liquid in the container 30. These can easily be viewed through the filler opening 29 when the cap 31 is removed.

Turning now to the embodiment of the invention shown in FIG. 7 of the drawings, the top of the container 30 is shown in cross-section and mounted therein is the tube supporting head 34 comprising the upper cap section 38 and lower section 36 from which depends the tubular housing 50. In this embodiment, the tubes having varying resistances to flow are tubes 90 of varying length spirally wound in layers about a center rod 92 depending from lower section 36 of the supporting head. The upper ends of the tubes 90 are inserted in the through bores 40 (only one shown) which are circularly arranged in the lower head section 36. The lower ends of the tubes 90 are retained in holes 94 in the retaining disc 96. In this embodiment, the lower end of the tubular housing 50 is provided with a filter comprising a plug 98 having a serrated edge 99 which is press fitted into the lower end of the housing 50. As will be apparent, the larger the inner diameter of the tubes 90, the greater will be the lengths of the tubes required to produce the desired varying resistances to liquid flow. As a specific example, tubing having an inner diameter of 0.022 inch and varying in length from 2 feet to 8 feet will generally provide the desired range of resistances to liquid flow for producing the desired metering rates required for accurate control of an average pool.

Figure 8:
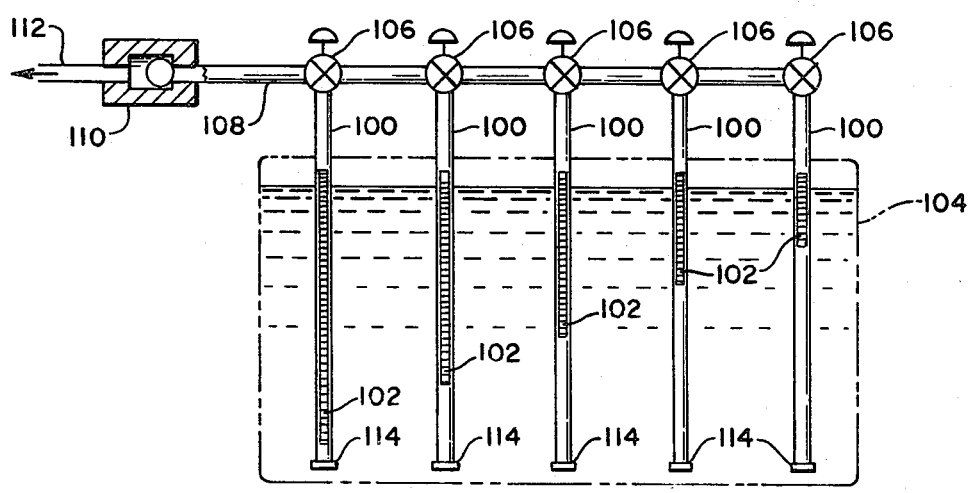
FIG. 8 is a side view partially in cross-section of a further modified embodiment of the chlorinator of this invention.

In the embodiment of the invention shown schematically in FIG. 8 of the drawings, the metering tubes 100 containing threaded rod inserts 102 which may be identical, respectively, with the tubes 32 and threaded rods 80 of the first-described embodiment, are arranged in a linear fashion rather than a cluster within the container indicated by dotted line 104. Each of the tubes 100 is connected by a separate manually operable shut-off valve 106 to an outlet pipe 108 which in turn is provided with a combination one-way and flow regulating valve 110 similar to valve 67 of the first embodiment having an outlet 112 for connection to the tube 24 which delivers the chlorinating liquid to the water recirculating system of the pool 12. The lower ends of the metering tubes 100 are provided with individual filters 114. In this embodiment, as in each of the preceding embodiments, all of the parts are made of corrosion resistant material, preferably an inert plastic such as polyethylene.

As will be appreciated, each of the described embodiments of the invention is easy to fabricate and assemble from readily available materials at reasonable cost and may be used with readily available and relatively inexpensive sodium hypochlorite solution such as is sold in stores and supermarkets as household bleach. Such solutions have the further advantage of being relatively safe to use and free of binders, which, if present, would tend to clog the filters.

The chlorinators of the present invention avoid the use of adjustable valves which are usually incapable of precise manual adjustment to attain or repeat the desired feed rate of chlorinating solution and instead provide for adjustment of the feed rate by selection of one of a plurality of metering tubes having a precise predetermined resistance to liquid flow. The chlorinators are easy to install and easy to operate and maintain.

As will be apparent to persons skilled in the art, various modifications, adaptations, and variations of the foregoing specific disclosure can be made without departing from the teachings of the present invention.

We claim:

1. In a chlorinator for metering a chlorinating liquid to a swimming pool and having an outlet and a metering system for conducting chlorinating liquid at a metered rate to the outlet, the improvement wherein the metering system comprises a bank of a plurality of independent metering tubes, each having an inlet end for receiving chlorinating liquid and an outlet end, said plurality of metering tubes having restricted liquid passageways of different resistence to liquid flow for metering chlorinating liquid from their inlet to their outlet at differing rates, and selector valve means for selectively connecting the plurality of metering tubes for metering chlorinating liquid to the chlorinator outlet for selectively controlling the metered rate of chlorinating liquid to the swimming pool.

2. A chlorinator as defined in claim 1 wherein a valve is disposed between the outlet and the metering tubes, said valve having means for restricting the effective size of the outlet responsive to increases in the velocity of liquid flow therethrough.

3. A chlorinator as defined in claim 1 or 2 wherein the metering tubes contain threaded rods of differing lengths.

4. A chlorinator as defined in claim 1 or 2 wherein the metering tubes are tubes of varying length.

5. A chlorinator as defined in claim 4 wherein the tubes are spirally wound in layers around the same vertical axis.

6. A chlorinator as defined in claim 2 wherein the valve is a ball valve of the type having a housing forming a chamber with inlet and outlet openings, a ball in the chamber adapted to move toward the outlet opening in response to increase in the velocity of liquid flowing therethrough, said chamber being contoured so that the flow path through the valve is restricted a the ball moves toward the outlet opening.

7. A chlorinator as defined in claim 6 wherein the flow responsive valve is also a one way valve preventing reverse flow of liquid therethrough.

8. A chlorinator as defined in claim 3 wherein the metering tubes are mounted within a tubular housing, having an open inlet end, and filter means is mounted at said open inlet end to filter the inlet flow of liquid into the tubular housing.

9. A chlorinator as defined in claim 4 wherein the metering tubes are mounted within a tubular housing, having an open inlet end, and filter means is mounted at said open inlet end to filter the inlet flow of liquid into the tubular housing.

10. A chlorinator as defined in claim 1 further comprising a liquid chlorinator container having a top opening, and wherein the selector valve means comprises a mounting head removably mounted in said opening, the metering tubes depending from said mounting head into the container.

11. A chlorinator as defined in claim 10 wherein a tubular housing depending from the mounting head surrounds the metering tubes and is provided at its lower end with inlet filtering means for filtering the inlet flow of liquid into the tubular housing.

12. A chlorinator as defined in claim 10 wherein the mounting head has a lower section to which the metering tubes are connected, and a rotatably adjustable cap section having means for connection to a selected one of said metering tubes depending upon the rotated position of the cap section.

13. A chlorinator as defined in claim 12 wherein the lower section of the mounting head has a plurality of circularly arranged throughbores to which the metering tubes are connected, the wherein outlet is mounted in the cap section of the mounting head, and the cap section is provided with means for connecting a selected one of the throughbores to the outlet depending upon the rotated position of the cap section relative to the lower section of the mounting head.

14. A chlorinator as defined in claim 13 wherein the cap section of the mounting head is provided with valve means for restricting the effective size of the outlet responsive to the velocity of liquid flow therethrough.

15. A chlorinator as defined in claim 12 wherein the metering tubes contain threaded rods of differing length.

16. A chlorinator as defined in claim 14 wherein the metering tubes are tubes of varying length.

17. A chlorinator as defined in claim 1 wherein the selector valve means comprises an individual shutoff valve for each metering tube for selectively connecting the tube to the outlet.

18. A chlorinator as defined in claim 1 wherein the selector valve means comprises rotary selector valve means for individually connecting the metering tubes to the outlet.

* * * * *